Aug. 8, 1944.   C. F. FINK   2,355,286
DRILL BUSHING
Filed April 24, 1942
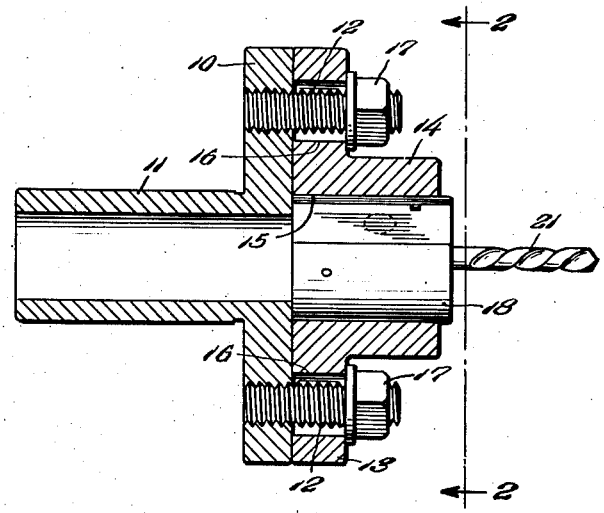
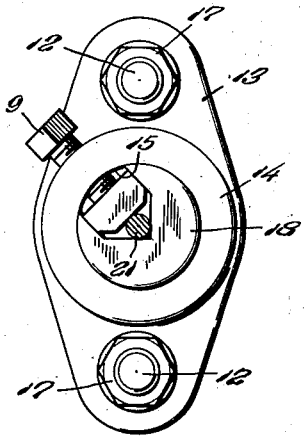
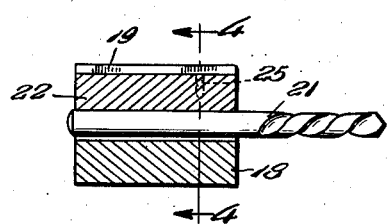
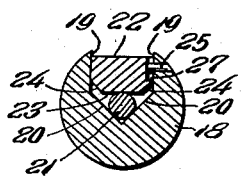
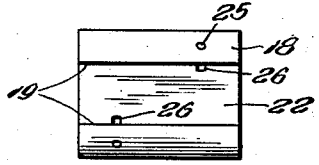
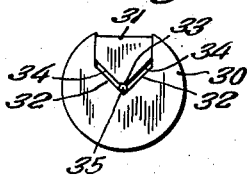
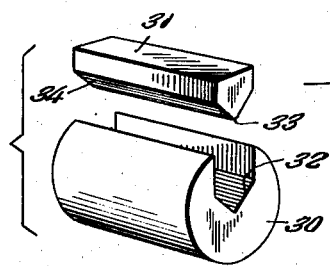
Inventor
Charles F. Fink
By Spear Donaldson & Hall
Attorneys Patented Aug. 8, 1944

2,355,286

UNITED STATES PATENT OFFICE 2,355,286

DRILL BUSHING

Charles F. Fink, Baltimore, Md., assignor to Trimble & Fink Mfg. Co., Inc., Baltimore, Md., a corporation of Maryland Application April 24, 1942, Serial No. 440,390

3 Claims. (Cl. 279—44)

This invention relates to tool holders and more particularly to a bushing for holding a twist drill in place in the turret head of a screw machine.

The usual drill bushing for screw machines has been of a size to accommodate only a single drill. It has consequently been necessary to have on hand a large number of such drill bushings in order to accommodate the large number of different size drills which are available. Moreover, such drill bushings have not effectively held the drill for the reason that the drill was not clamped throughout the length of the bushing.

With the bushing of the present invention a large number of varying sized drills may be held so that only a few different sized bushings will hold all of the drills which are available. Moreover, the entire length of the drill which is within the bushing is firmly clamped by the bushing.

In the accompanying drawing:

Fig. 1 is a longitudinal sectional view, parts being shown in elevation, through a tool holder employed in the turret head of a screw machine, a drill bushing contemplated by the invention, being therein.

Fig. 2 is a view on the line 2—2 of Fig. 1.

Fig. 3 is a longitudinal section through the drill bushing of Fig. 1.

Fig. 4 is a section on the line 4—4 of Fig. 3.

Fig. 5 is a plan view of the bushing of Figs. 3 and 4.

Fig. 6 is an end view of a drill bushing for accommodating drills of a size smaller than those which are to be accommodated by the bushing of Figs. 3, 4 and 5.

Fig. 7 is a perspective view of the bushing of Fig. 6, the parts being separated.

The carrier for the usual bushing holder of a screw machine is made of a face plate 10 and an integral attaching shank 11. The shank 11 of this carrier is of a size to fit into and be clamped securely in a socket in the turret head of a screw machine. The end face of the face plate 10 is perpendicular to the axis of the shank 11. Threaded studs 12 project from this end face on diametrically opposite sides of the shank 11.

The bushing holder is made up of a base flange 13 and an integral boss 14 having a socket 15 therein. Holes 16 are formed through the base plate 13 in line with the studs 12. These holes 16 should be considerably larger in diameter than the diameter of the studs 12 so that a limited movement of the bushing holder upon the face of the carrier will be permitted. To clamp the flange 13 of the bushing holder firmly against the face plate 10 in any set position, nuts 17 may be tightened upon the studs 12.

Due to the flat contact between the opposing faces of the face plate 10 and the base flange 13, the bushing holder may be moved about upon the face plate 10 within the limits afforded by the size of the holes 16, while maintaining at all times the parallelism of the axis of the boss 14. Thus, by loosening the nuts 17, the bushing holder may be moved to a new position, without disturbing the parallelism between the axis of the boss 14, and the axis of the shank 11.

Through the side of the boss 14 passes a set screw 9. This set screw is threaded into the boss 14 so that it may be used to clamp a drill or tool bushing in place in the socket 15.

The drill bushing 18 of the invention is of an external size to snugly fit within the socket 15 and the bushing 18 should have approximately the same length as the total length of the bushing holder. As a feature of the invention, a slot is formed in the bushing 18 lengthwise thereof, so that the slot opens out not only at the periphery of the bushing, but opens at the opposite ends of the bushing 18 as well. The opposite side walls 19 of this slot are parallel to each other and to a diametrical plane passing through the axis of the bushing 18. The width of the slot is not critical, it being only necessary that the slot be wide enough to accommodate the largest size drill which may be located in the bushing.

The bottom of the slot in bushing 18 should be of V-shape so that the faces 20 converge substantially to a meeting line which lies in the same diametrical plane with respect to which the sides 19, 19 are paralleled. This meeting line of the converging faces 20—20 should lie on the opposite side of the axis of the bushing 18 from the side of the bushing into which the slot opens. The distance to which this line of convergence of the faces 20—20 will lie beyond the axis of the bushing 18 depends upon the range of the sizes of drills for which the particular bushing is intended. Thus, for a range of larger size drills this line of convergence will be located further from the axis of the bushing 18.

To clamp in place a drill 21 which may be located at the bottom of the slot in bushing 18, a presser block 22 is provided. This presser block 22 has the same length as the bushing 18. Its opposite sides should be parallel and the block should be of the same width as the distance between the side walls 19 so that the presser block fits closely in the slot. The innermost face of the presser block should be flat to provide a face 23 to bear upon the drill 21 and this face preferably should be at right angles to the opposite parallel sides of the block 22. Joining the face 23 with the opposite parallel sides of the presser block are inclined faces 24 which may have substantially the same inclination with respect to each other as do the faces 20 at the bottom of the slot.

The formation of the faces 24, 24 permits the presser block 22 to descend deeper into the slot in the bushing 18 so that a smaller size drill than that shown in Fig. 4 may be clamped in place. It will be apparent that the width of the face 23 of the presser block is not critical inasmuch as this face will have only a line contact with the drill. The thickness of the presser block 22 outwardly from the face 23 is determined by the range of drill sizes which are intended to be accommodated by that particular presser block 22 and bushing 18.

The presser block 22 may be prevented from displacement out of the slot by the provision of pins 25 which are carried by the bushing 18. These pins 25 project into the slot from the opposite walls 19 thereof, and preferably are at the opposite ends of the slot as appears from Fig. 5. Grooves 26 are formed in the opposite parallel sides of the presser block 22 in line with the pins 25, but these grooves 26 do not extend throughout the height of the presser block, with the result that shoulders 27 are provided. These shoulders 27 will contact the pins 25 upon outward movement of the presser block 22 and prevent complete removal of the presser block.

When the bushing 18 is located in the socket 15 it should be so oriented that set screw 9 will bear upon the presser block 22 as shown in Fig. 2. The set screw 9 therefore not only will clamp the drill 21 in place between the face 23 and the faces 20, but in addition will serve to clamp the bushing 18 against displacement from the socket 15.

An important advantage obtained by the bushing of the invention is that the drill is clamped throughout the length of the bushing. This is because the drill lies against the faces 20 at the bottom of the slot along the entire length of the bushing and because the face 23 of the presser block likewise bears upon the drill along the entire length of the presser block. Drill breakage will be reduced because the end face of the bushing 18, which is toward the drill, and the corresponding end face of the presser block 22 are substantially flush and the clamping face 23 and clamping faces 20 contact the drill up to these flush end faces. Thus, the clamping action is exerted at three places around the drill up to the endmost point of contact along the drill toward the drill flutes.

A further advantage of the bushing of the invention resides in the fact that the drill is contacted at three places about its periphery. Because of this three-point bearing, the drill is securely clamped against sidewise displacement in any direction. Moreover, due to the three-point contact which is afforded, a drill may be replaced by another one of the same size and have the axis of the new drill occupy the exact position of the former drill. This is because the convergence of the faces 20 determines the position of the drill at the bottom of the slot and the pressing action of the block 22 forces the drill into this position.

In Figs. 6 and 7 is shown the construction of a bushing 30 and presser block 31 which will accommodate drills of very small size. The slot in bushing 30 does not extend as deeply into the bushing 30 as does the slot in the bushing 18, but otherwise its formation is the same. As is apparent from Fig. 6, the meeting line of the converging faces 32 at the bottom of the slot is slightly beyond the axis of the bushing 30. To permit the face 33 of the presser block 31 to bear upon a small drill 35 at the bottom of the slot, this face 33 is only of small width and the converging faces 34 are elongated so that the face 33 lies at a considerable distance from the outer face of the presser block 31. With the bushing of Figs. 6 and 7 therefor a limited range of small size drills may be held in place.

It will be apparent that variations from the proportions shown in Figs. 4 and 6 may be made to provide a bushing and presser block which will accommodate drills of a different range of sizes. Any one bushing and its associated presser block will accommodate a number of different sizes of drills within a certain range. The limits of this range are determined by the thickness of the presser block and the depth of the slot in the bushing. Thus, a drill of too small a size will not be contacted by the face of a thin presser block, when the presser block is in its innermost position. Nor will a drill of too large a size be insertable in place if the presser block is too thick as the presser block will project outside of the bushing.

The range of drills which may be held in place by any one bushing is also limited by the extent, permitted by holes 16, to which the base flange 13 may be moved about the face plate 10. This follows from the fact that the axis of each different size drill which is located in any one bushing will occupy a different position from the axis of the bushing itself. To compensate for this different positioning of the axes of drills of different sizes and to bring the axis of a particular drill into axial alignment with the center of the work, it is merely necessary to loosen the nuts 17 and move the flange 13 upon the face plate 10 and then tighten the nuts 17.

What I claim is:

1. A drill bushing comprising a body having longitudinally thereof a slot against the bottom wall of which a drill is to be held, and a presser block movable in said slot and having a face opposing said bottom wall to bear upon a drill, said face terminating at the corresponding end of said bottom wall whereby a drill is contacted to the same point along its length by said face and by said bottom wall, a side wall of said presser block having a transverse groove therein terminating in a shoulder within the block, a pin carried by said bushing extending into said groove to prevent longitudinal movement of the presser block along the slot, said shoulder on contacting said pin preventing complete outward removal of the presser block from the slot.

2. In a tool holder, a generally cylindrical shaped bushing having a longitudinally extending slot therein open at the periphery of the bushing along the length thereof, substantially parallel side walls defining the circumferential width of said slot, a presser block within said slot movable inwardly of the bushing for engaging and clamping a tool in the slot, substantially parallel side walls defining the width of the presser block arranged closely adjacent the side walls of said slot, a side wall of said presser block having a groove therein terminating in a shoulder at an inner end of the groove, and a pin carried by the bushing extending in a generally chordal direction into said groove.

3. In a tool holder, a bushing having a longitudinal slot therein open at the periphery of the bushing along the length thereof, substantially parallel side walls defining the circumferential extent of said slot merging with two substantially flat surfaces converging inwardly of the body and meeting on a line beyond the longitudinal axis of the bushing, a presser block fitting between said parallel walls of the slot and movable radially inwardly and outwardly of the slot, an innermost flat face on said presser block extending throughout the length thereof adapted to bear against and urge a tool against said converging surfaces, the innermost face of said presser block being of less width than the portion defined by said parallel side walls and being joined to the opposite side walls of the presser block by faces having substantially the same inclination as the converging surfaces at the bottom of the slot, a bushing holder having a socket therein for receiving said bushing, a radially arranged screw thread through said bushing holder adapted to engage and move the presser block inwardly of the slot and retain the bushing within the bushing holder, a flange carried by the bushing holder having openings therein, supporting studs extending through said openings, and said studs being of smaller dimensions than said openings whereby the bushing holder may be adjusted relative to said studs.

CHARLES F. FINK.